United States Patent [19]

Wagner

[11] Patent Number: 5,511,578
[45] Date of Patent: Apr. 30, 1996

[54] TOOL FOR INSTALLING A STOPPER IN A GAS CONDUIT WALL

[76] Inventor: Dennis J. Wagner, 63 Wilson La., Bethpage, N.Y. 11714

[21] Appl. No.: 267,668

[22] Filed: Jun. 29, 1994

[51] Int. Cl.⁶ .............................. F16K 43/00; F16L 55/12
[52] U.S. Cl. ..................... 137/315; 137/318; 138/94; 138/97
[58] Field of Search ............... 137/15, 315, 318, 137/317; 138/89, 94, 97

[56] References Cited

U.S. PATENT DOCUMENTS

| | | | |
|---|---|---|---|
| 1,850,040 | 3/1932 | Turner | 138/94 |
| 2,170,866 | 8/1939 | McAllister | 138/94 |
| 2,763,282 | 9/1956 | Reedy et al. | 137/318 |
| 2,911,859 | 11/1959 | Longley et al. | 137/318 |
| 3,275,023 | 9/1966 | Raspante | 137/315 |
| 3,473,555 | 10/1969 | Martin et al. | 137/315 |
| 4,019,541 | 4/1977 | Koppl | 138/94 |
| 4,127,141 | 11/1978 | Ledonne et al. | 137/15 |
| 4,184,504 | 1/1980 | Carmichael et al. | 137/318 |
| 4,239,055 | 12/1980 | Van Coffman | 137/315 |
| 4,503,879 | 3/1985 | Lazarus | 137/315 |
| 5,058,519 | 10/1991 | Collins | 29/402.09 |
| 5,099,868 | 3/1992 | Weber | 137/15 |
| 5,152,311 | 10/1992 | McCreary | 137/15 |

*Primary Examiner*—George L. Walton
*Attorney, Agent, or Firm*—Brooks Haidt Haffner & Delahunty

[57] ABSTRACT

The tool of the invention is used to insert and secure a stopper plug to close a hole in the wall of a pipe carrying fluid under pressure. This permits removal of a defective pipe fitting such as a tee or a valve. The stopper plug includes a toggle or anchor for engaging the inner wall of the pipe at the location of the hole to be sealed shut. After the stopper plug is secured in place, the defective fitting is removed.

7 Claims, 5 Drawing Sheets

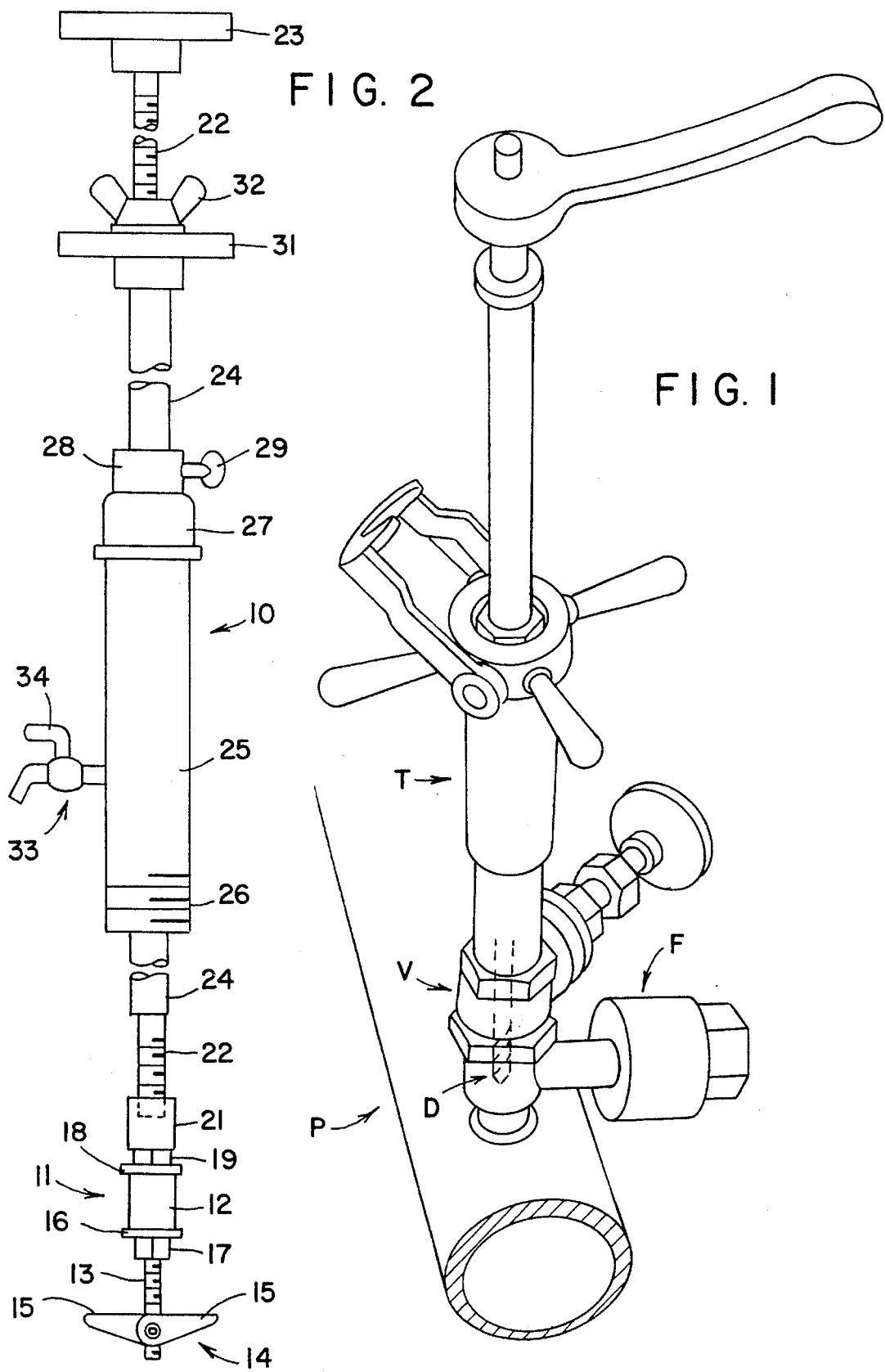

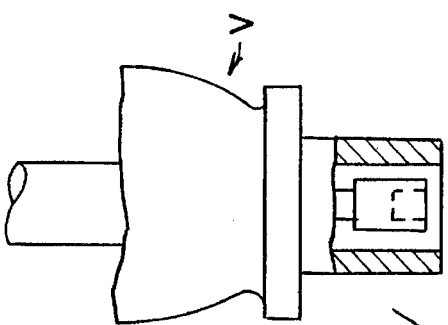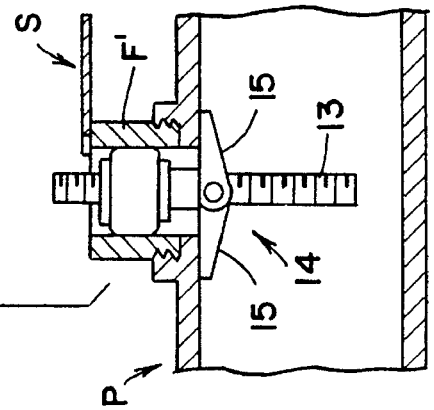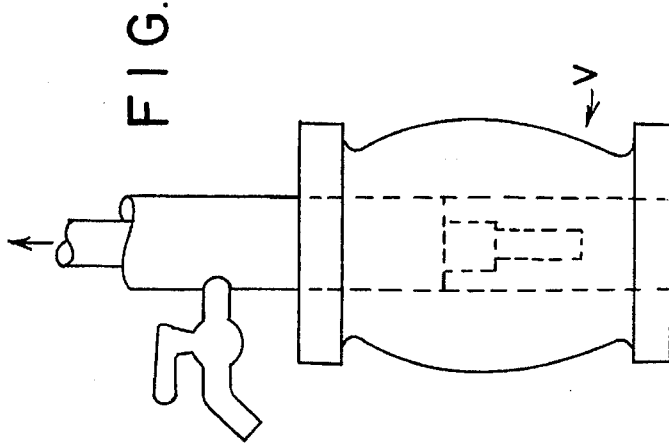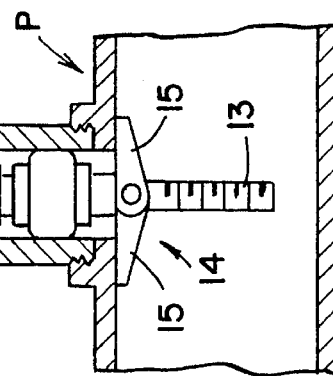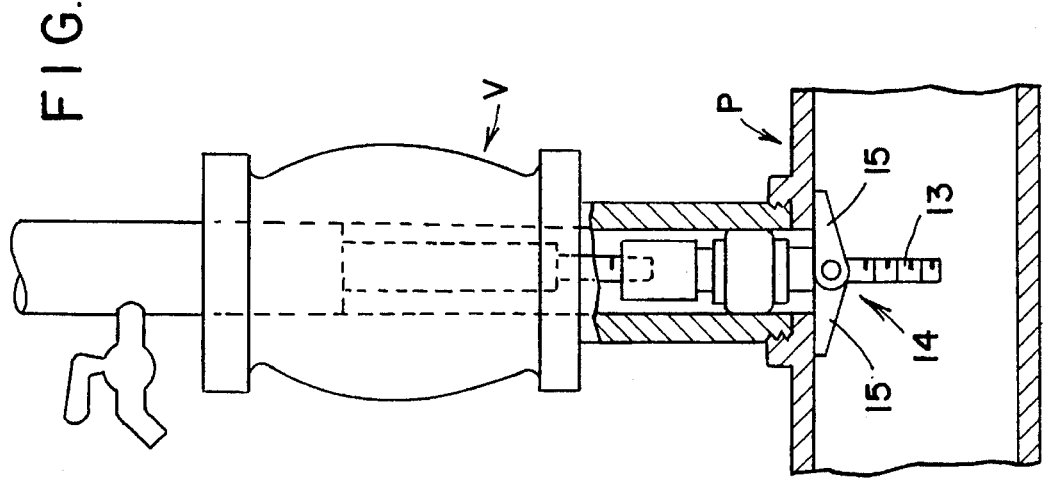
FIG. 7  FIG. 8  FIG. 9

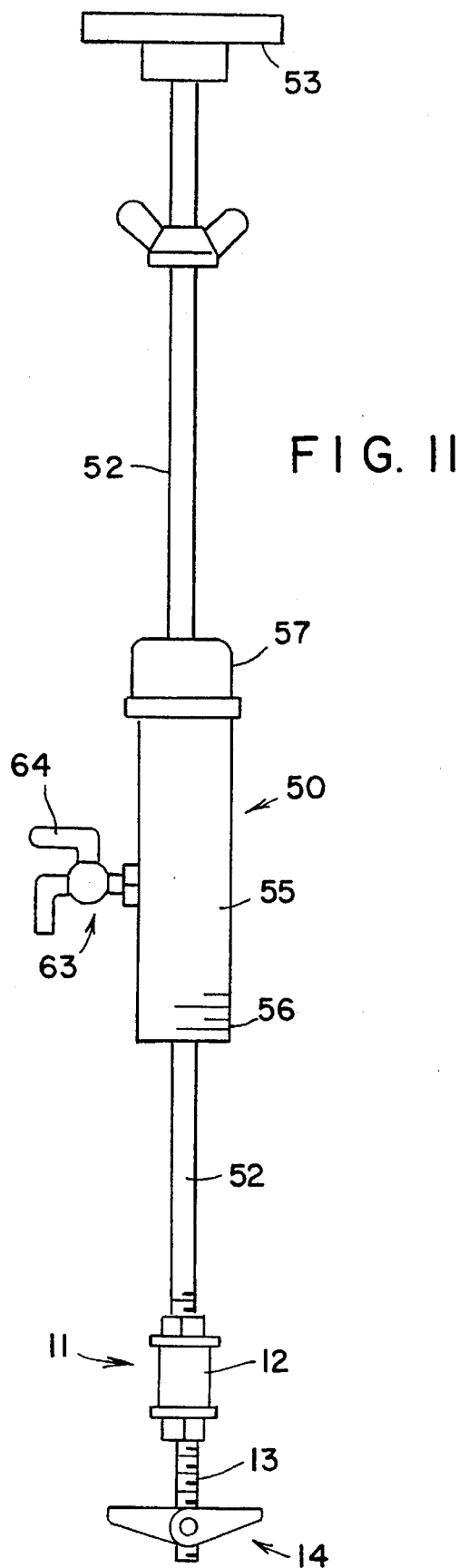

TOOL FOR INSTALLING A STOPPER IN A GAS CONDUIT WALL

BACKGROUND OF THE INVENTION

The present invention relates to the installation of a permanent stopper or plug for preventing the escape of gas under pressure from a pipe. A tool is provided for inserting a stopper in a hole through the pipe wall to prevent the escape of gas.

DESCRIPTION OF THE PRIOR ART

The pipe fittings installed in underground systems for the delivery of gas to residential and commercial users can, over time, develop leaks which require the attention of gas utility companies. Fittings such as pipe tees connected to pipe mains that carry gas under pressure which can be as low as one quarter pound or as much as fifty pounds per square inch or more can become so worn or damaged as to permit leakage of substantial volumes of gas to the atmosphere, creating an environmental hazard and posing a risk of explosive combustion. Such leaks must be promptly sealed, preferably without interruption of service to consumers of gas.

One solution to this problem of gas leakage in the past has been to excavate a trench extending in both the upstream and downstream directions from the leak and, cutting off gas flow through the pipe after installing a bypass and welded fittings, to remove and replace the section of pipe to which the leaking fitting is connected. Alternatively, there are devices for installation in the pipe both upstream and downstream of a leaking fitting which serve temporarily to interrupt gas flow while a pipe section that includes a leaking fitting is disconnected at both ends and replaced with or without a new fitting. Both of these prior art approaches are time and labor consuming.

Other methods of replacing leaking pipe fittings are known which allow gas under pressure to escape to the atmosphere while the leaking valve or other fitting is being replaced. Such methods require special equipment such as fire resistant clothing and respirators for the workers, and the released gas constitutes a safety hazard.

U.S. Pat. No. 2,763,282 describes a pipe stopper fitting which, when installed, completely closes off the internal passage through a pipe and shuts off glas flow through the pipe.

Devices for sealing an opening in a pipe wall during removal of a pipe fitting are shown in U.S. Pat. Nos. 4,127,141; 4,239,055 and 5,099,868. The arrangements of all of these patents involve the installation of temporary pressure plugs made of rubber or other compressible material to provide a gas-tight seal for a hole in a pipe wall. The pressure plugs of these three patents are removed from the pipe after use, and are not intended to be left permanently in place. Removal of the pressure plugs when the pipe has been provided with a new fitting or a pipe saddle not only takes time but also leaves some uncertainty about the possibility of leakage after pipe repair has been completed.

SUMMARY OF THE INVENTION

The use of the tool of the present invention for repairing a leak such as a leaking fitting in a pressurized pipe for supplying gas under pressure produces a permanent internal seal at a hole in the pipe section that has been repaired in addition to the external seal provided by a plug held in place on the pipe section by a saddle or the like. The tool can be safely used without the need for workers to wear protective clothing or gas masks while the pipe under repair continues to carry a flow of gas under pressure. The tool is of simple, reliable construction and easy to use.

The tool of the invention is used to insert a stopper plug into a hole in a pipe side wall. The stopper plug includes a compressible, elastomeric, generally cylindrical sealing member. The sealing member expands radially when axially compressed, to close the hole tightly against the escape of gas under pressure from within the pipe. Compressive force is applied to the stopper plug by the cooperation of threads on a rod member which extends axially through the stopper plug with a toggle or anchor that has a pair of wings that extend to engage the inner wall of the pipe upon rotation of the threaded rod. When the expanded plug stopper is securely in place, sealing the hole, the threaded rod-like member is separated from a socket carried by an elongated shaft which had served to rotate the stopper plug, leaving the stopper plug in place, sealing the hole. The defective fitting is removed, for example by sawing the fitting off. A pipe saddle, clamp or other fitting, which can receive a rigid plug, is then secured around the pipe at the location of the internally sealed hole to provide a permanent external closure of the hole.

The rotatable shaft that is used to rotate the rod member of the stopper plug extends through a threaded, cylindrical nipple member or housing which can be threadedly secured to a shut off valve that has been attached to the leaking fitting so that leakage does not occur while the stopper plug is being positioned and secured in the hole in the pipe wall. The nipple preferably has a stopcock for bleeding off whatever gas is contained in the nipple. Cessation of gas flow from the stopcock shows that the hole has been sealed.

The shaft is provided at its end remote from the stopper plug with a handle for manual rotation of the shaft to open the wings of the toggle and compress the elastomeric member so that it expands radially to seal the hole.

The invention provides a method for sealing an opening through the side wall of a linear pipe section, such as a main carrying gas under pressure. Such a seal is required when a defective pipe fitting such as a tee or a valve must be removed. The valve or tee or other fitting has a passage that extends at an angle of 90 degrees to the axis of the pipe to which the fitting is attached. The fitting to be removed is also adapted for installation of a gate valve or the like which also has a cylindrical passage that forms a linear continuation of the passage through the fitting. Thus when a gate valve is mounted on the pipe fitting which is to be removed, there is a continuous passage through the fitting and the gate valve extending radially at a right angle to the axis of the pipe section. The tool of the invention serves to insert a stopper plug through this passage to the location of the hole in the pipe section side wall that is to be sealed.

The first step, after tapping the pipe wall to ensure that the hole to be plugged is circular, is to attach a gate valve or the like to the pipe fitting that is going to be removed. Then the stopper plug is inserted through the gate valve and the fitting. The stopper plug has a toggle that engages the inner wall of the pipe section. A radially expanding body of the stopper plug is expanded in place to close the hole against the escape of the fluid contents of the pipe. The tool is removed, leaving the stopper plug in place and the fitting is cut off just above the location of the stopper plug, leaving a stub of the removed fitting on the pipe. Then a clamp, saddle, collar or similar known device is installed around the pipe section and around the stub of the fitting that has been removed.

Two embodiments of the tool of the invention are described in conjunction with the accompanying drawings which will enable those acquainted with the art to understand fully the objects, features and advantages of the invention.

BRIEF DESCRIPTION OF THE DRAWINGS

FIG. 1 illustrates the preparation of a pipe section for the installation of a stopper plug in accordance with the invention.

FIG. 2 is a side view of a tool and stopper plug according to the invention.

FIG. 7 shows the stopper plug in place in its final position.

FIG. 8 shows how the stopper plug is separated from the tool after the plug has been installed and locked in place.

FIG. 9 illustrates the cutting off of a pipe fitting, leaving a stub in place around the stopper plug.

FIG. 11 is a side view of a second embodiment of the tool of the invention.

DETAILED DESCRIPTION OF PREFERRED EMBODIMENTS

Figure 6:
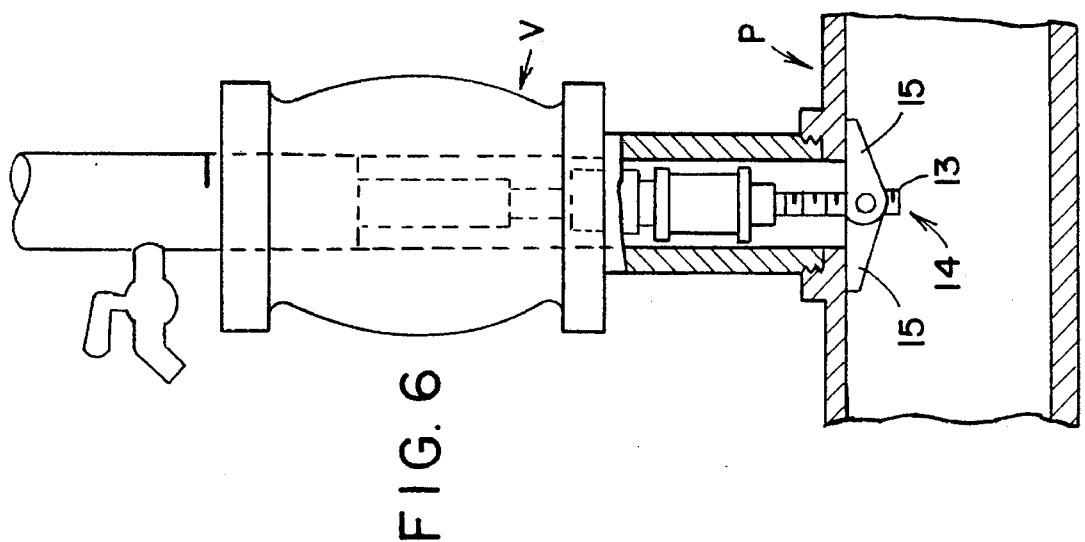
FIG. 6 is a view similar to those of FIGS. 4 and 5 and illustrating the operation of a toggle.

FIG. 1 illustrates a way in which a pipe section generally designated P equipped with a fitting F, illustrated as a service tee, can be prepared for use of the tool of the invention to insert a stopper plug that remains in place after removal of the fitting F.

The invention is described as applied to the repair of a leak resulting from a defect in a fitting in a piping system for the supply of natural gas to a residential or commercial consumer, but it will be understood that the invention is more generally applicable to the installation of a stopper plug to close a hole in the sidewall of a conduit carrying any of many different fluids under pressure. In accordance with the invention, the leaking fitting is removed and replaced by a permanent closure of the hole in the pipe sidewall.

The preparatory procedure shown in FIG. 1 can be used to assure that a hole through the wall of the pipe P has a circular shape, since for any of a number of reasons, the hole to be plugged may have an elongated or irregular shape which could result in less than optimum sealing of the hole by application of the invention.

Thus, FIG. 1 shows a gate valve generally designated V of well known structure and function secured in place atop the fitting. A tapping machine of the type well known and widely used for tapping water and gas mains, and generally designated by the reference character T, is mounted atop the gate valve V as shown in FIG. 1. The gate valve is opened and the tapping machine is used in a manner well known in the art to enlarge the existing hole in the pipe side wall, producing a uniformly circular hole. The tapping machine drill bit D is then withdrawn, the gate valve V is closed and the tapping machine T is removed.

In an illustrative example, if the pipe P is a 2 inch diameter pipe, the gate valve V can be a 1 inch gate valve, and the tapping machine can have an 11/16 inch drill bit.

After the tapping machine T has been removed and the gate valve has been closed, the uniformly circular hole through the pipe wall is ready for closure by means of the tool and stopper plug of the invention. The preparatory procedure described above for assuring that the hole is circular and of the desired diameter is not necessary in some cases, and is, of course, not employed in such cases.

Figure 4:
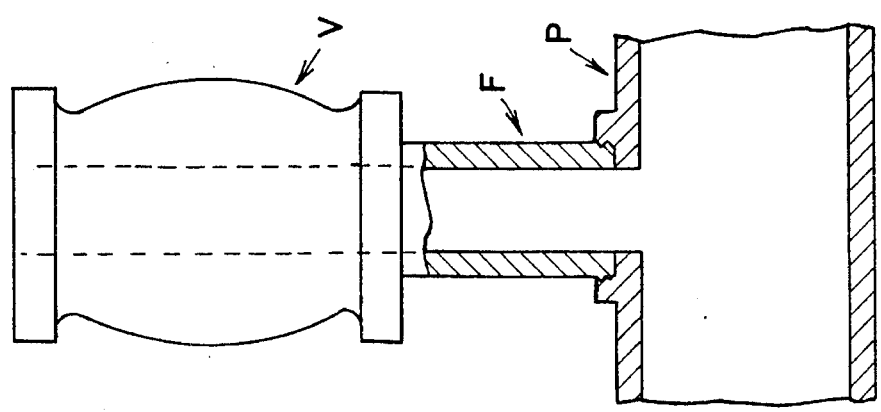
FIG. 4 is a view, partly in section, of a pipe section having a hole in the pipe side wall into which a stopper plug is to be inserted.

FIG. 4 illustrates the condition of the pipe section P, fitting F and gate valve V existing when the tool of the invention is to be used. The valve V is in closed condition, so gas can only escape from the pipe P and fitting F through a pre-existing leak.

Figure 5:
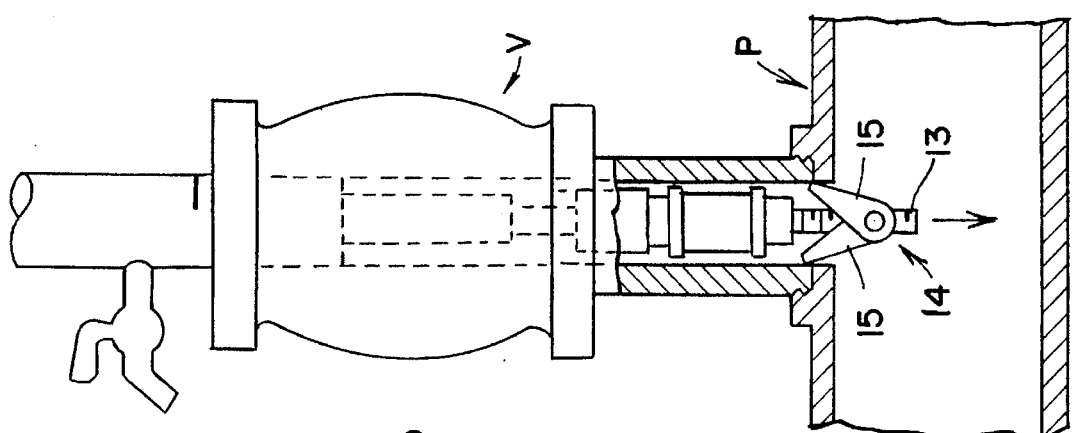
FIG. 5 is a view similar to that of FIG. 4 showing an intermediate stage in the process of inserting a stopper plug in accordance with the invention.

FIG. 2 shows an overall view of a tool according to the invention, generally designated by the reference numeral 10. The stopper plug generally designated by reference numeral 11 is seen to be carried by the tool 10 in FIG. 2. The stopper plug 11 has a compressible, elastomeric, generally cylindrical body 12 which can be made of rubber or some suitable synthetic material which is resistant to damage from the fluid carried in the pipe. The stopper plug body 12 is mounted on, and surrounds a threaded element 13 seen in FIG. 2 as extending above and below the body 12. Near the end of the threaded element 13 is a toggle or anchor 14 comprising two flanged wings 15 shown in FIG. 2 in their extended condition. The flanged wings 15 of the toggle 14 are pivotally mounted to extend from opposite sides of a nut (not shown in the drawings) to retract against the action of a spring (not shown) for passage through a hole in the pipe wall as seen in FIG. 5 and, after passage through the hole, to extend under the action of the spring as shown in FIG. 6. The toggle 14 can be of a well-known and readily commercially available type, having wings 15 of aluminum, steel or other rigid material that resists deterioration in the presence of natural gas or whatever other fluid is carried by the pipe P. The toggle 14 is chosen to be of appropriate size for the size of the pipe P and hole where it is to be employed. Thus, in the case of a two-inch diameter pipe, the spread wings 15 of the toggle 14 can preferably extend about two inches from tip to tip.

The body 12 of the stopper plug 11 extends along the threaded member 13 between a lower or inner washer 16 and nut 17 and an upper or outer washer 18 and nut 19 as shown in FIG. 2. When the upper washer 18 and nut 19 are rotated while the lower washer 16 and nut 17 remain stationary, the upper washer 18 and nut 19 are tightened downwardly against the elastomeric body 12, compressing the body 12 in the axial direction and causing the body 12 to expand radially as seen in FIGS. 7, 8, 9 and 10.

Such compression of the stopper plug body 12 is effected by rotation of the threaded member 13 which is shown in FIG. 2 to be threadedly and removably mounted in a socket element 21 carried at the lower end of an elongated shaft 22. At its upper end the shaft 22 is secured to a handle 23 for manual rotation of the shaft 22.

In the embodiment of FIG. 2, the shaft 22 is rotatably enclosed within a tubular sleeve 24 which sleeve, in turn, is surrounded by a cylindrical outer housing 25. The outer housing 25 has external threads at its lower end 26 for securing the housing 25 to the internal threads of the gate valve V as illustrated in FIGS. 4–8. The upper or outer end of the housing 25 is fitted with a cap 27 surmounted by a collar 28 through which the tubular sleeve 24 extends. A suitable sealing gasket (not shown) prevents escape of gas through the cap 27 around the sleeve 24. A thumbscrew 29 extends radially through the collar 28 for locking the tubular sleeve 24 against motion relative to the cylindrical housing 25.

The tubular sleeve 24 has a handle 31 affixed to its upper end. A wing nut 32 encircles the shaft 22 above the handle 31 for securing the shaft 22 relative to the tubular sleeve 24.

Preferably, the outer housing 25 has a stopcock or bleeder valve 33 for exhausting gas from the interior of the housing 25 by opening the stopcock 33 by means of the handle 34 of the stopcock 33.

The tool 10 is used to insert and secure the stopper plug 11 to close a circular hole in a pipe wall, the hole having been tapped, if necessary. The external threads 26 of the outer housing are screwed into the receiving internal threads of the gate valve V which is secured atop the leaking fitting to be removed. At this time the gate valve V is in closed condition. Then the gate valve V is opened, as shown in FIG. 5, and the tubular sleeve 24 is pushed downward to insert the toggle 14 through the fitting F and the hole in the wall of the pipe P as shown in FIG. 5. When the toggle 14 has been inserted into the pipe P the locking collar 28 is secured to the tubular sleeve by tightening the thumbscrew 29. The tubular sleeve 24 is now fixed in place. Next, the handle 23 is turned to retract the shaft 22 until the wings 15 of the toggle 14 are extended as shown in FIG. 6 and the toggle 14 is snugly in contact with the inner wall of the pipe section P.

The thumbscrew 29 is then loosened to release the tubular sleeve 24 and the sleeve 24 is lowered from the position shown in FIG. 6 to the position shown in FIG. 7. The handle 23 is used to hold the shaft 22 stationary while the tubular sleeve 24 is rotated to tighten the nut 19 down along with the washer 18 by rotating the socket 21. This compresses the elastomeric body 12 of the stopper plug 11 in the axial direction and causes the elastomeric body 12 to expand radially within the fitting F as shown in FIG. 7. The expansion of the body 12 closes the internal passage of the fitting F.

The stopcock 33 is then opened, venting any gas contained within the housing 25. If leakage is continuing, gas will continue to escape from the stopcock and further remedial action will be called for. Normally, no further gas will escape after the small amount of gas under pressure within the housing 25 has escaped to the atmosphere.

The elastomeric body 12 of the stopper plug 11 having been expanded to seal off the fitting F, the next step is to pull the tubular sleeve 24 upward by a distance sufficient to disengage the threaded member 13 from the socket 21. The thumbscrew 29 is tightened to prevent the sleeve 24 and shaft 22 from falling back. The situation at this point is illustrated by FIG. 8.

The stopper plug 11 is now in place with the body 12 expanded to close the interior passage through the fitting F and with the toggle 14 securing the stopper plug near the wall of the pipe section P as shown in FIG. 9. The next step is to sever the fitting by use of a saw S just above the stopper plug 11, as shown in FIG. 9, leaving the plug 11 in place and removing the defective fitting F. A short stub portion $F^1$ remains in place on the pipe P. A piping saddle or clamp can then be secured around the pipe section P as shown in FIG. 10.

Figure 10:
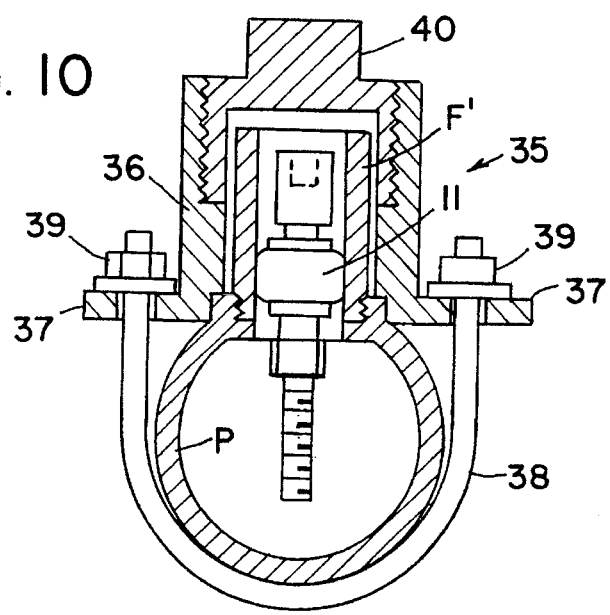
FIG. 10 is a view in partial section taken along the axis of the pipe section showing a saddle and plug secured around the pipe section.
Figure 3:
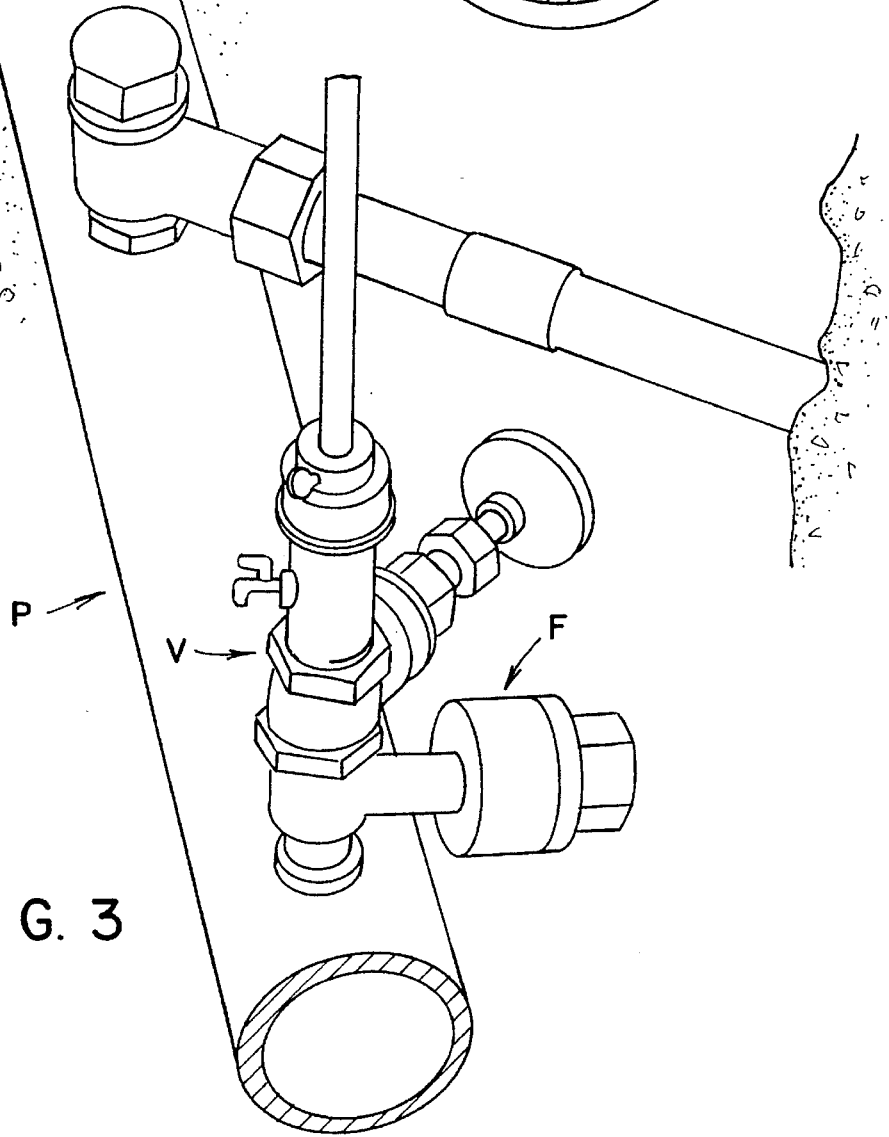
FIG. 3 shows how the tool of the invention is used in conjunction with a valve temporarily secured to a pipe fitting for the insertion of a stopper plug to seal a hole in a pipe wall.

A typical conventional pipe saddle generally designated by reference numeral 35 is shown in FIG. 10 in place on the pipe section P at the location where the plug stopper 11 has been installed. The stub $F^1$ remaining after the fitting F has been severed and removed is shown to be enclosed within a generally cylindrical body 36 of the saddle 35. Flanges 37 extend from both sides of the saddle 36 and a U-shaped bar 38 placed around the pipe section P has ends that extend through the flanges 37 securing the saddle 35 in position with nuts 39. A solid plug 40 is threadedly received by the cylindrical saddle body 36. Even if the plug stopper 11 should fail, leakage at the repaired location cannot occur after the saddle 35 is fitted on the pipe section P.

Another embodiment of the tool according to the invention is shown in FIG. 11, where it is generally designated by reference numeral 50. The tool 50 can be employed to install the same stopper plug 11, with its compressible body 12, toggle 14, etc. that has been described in connection with the first embodiment 10 of the tool of the invention.

The tool 50 has an elongated shaft 52 like the shaft 22 of the tool 10. The shaft 52 terminates in a socket element 51 for receiving the threaded member 13 of the stopper plug 11. However, the tool 50 does not have any element corresponding to the tubular sleeve 24 of the tool 10. The elongated shaft 52 fits directly within a cylindrical outer housing 55, having external threads at its lower end 56. The housing 55 is fitted at its upper end with a cap 57 through which the shaft 52 passes. A suitable sealing gasket (not shown) prevents the escape of gas through the cap 57 around the shaft 52.

The upper end of the shaft 52 is provided with a handle 53 for rotation of the shaft 52 relative to the housing 55.

Preferably, the housing 55 has a stopcock or bleeder valve 63 for exhausting gas from the interior of the housing 55 by opening the stopcock 63 by means of the stopcock handle 64 when the tool is used to place a stopper plug in a pipe carrying gas under pressure.

The use of the tool 50 shown in FIG. 11 is similar to that of the tool 10 of FIG. 2. A gate valve is installed on top of the fitting to be removed. If necessary, the hole through the pipe wall that opens into the fitting is made circular by use of a tapping machine as described above with respect to FIG. 1. The stopper tool 50 is mounted atop the gate valve, secured in place by the interfitting external threads at the lower end 56 of the housing 55 and the internal threads of the gate valve. The gate valve is then opened.

The stopper plug 11 is pushed down into the pipe section by pushing the shaft 52 downwards. When the toggle wings 15 have opened within the pipe, the shaft 52 is pulled upward, seating the toggle 14 against the inner wall of the pipe.

The tool user then turns the shaft 52 by means of the handle 53 until resistance to further turning indicates that the body 12 of the stopper plug 11 has expanded to close the hole against the escape of gas. Excessive tightening, as by the use of a wrench, should be avoided, since excessive force could damage the toggle 14.

The next step is to open the stopcock 63, venting gas from within the housing 55. Cessation of the escape of gas shows that the hole is sealed shut by the stopper plug 11.

The handle 53 is then turned to release the stopper plug 11 from the socket 51. Before rotating the shaft 52 to release the stopper plug, one may make a measurement of the distance the shaft is extended to determine the location of the stopper plug 11 with respect to the fitting to be removed. After the shaft 52 has been retracted from the stopper plug 11, the housing 55 is unscrewed from its position atop the valve. The fitting is cut off just above the stopper plug as previously described with reference to the illustration of FIG. 9, and a saddle, clamp or sleeve is installed as illustrated with reference to the saddle 35 shown in FIG. 10.

What is claimed is:

1. A tool for installing a stopper plug having a radially expansible body in a hole in order to close the hole against fluid leakage, the tool comprising: a one-piece socket element having internal threads for releasably engaging an externally threaded element that extends above and through said radially expansible body of the stopper plug for holding and positioning the stopper plug during installation of the plug and releasing said externally threaded element after installation of the stopper plug; said socket element being mounted on one end of an elongated shaft securing means cooperatively associated with the end of said threaded element that is positioned below the stopper plug, said elongated shaft carrying the socket element for moving the socket element linearly and rotationally by moving said shaft said threaded element and said securing means to position and secure the stopper plug with said hole and for withdrawing the socket element after installation of the stopper plug; a generally cylindrical housing through which the elongated shaft extends axially and slidably therein, said housing having a cap at one end through which said shaft extends and attachment means at an opposite housing end for securing the housing to a cylindrical member that defines said hole.

2. The tool of claim 1 wherein the housing has means for sealing the housing against the escape of fluid and means for venting the housing to allow the escape of fluid.

3. The tool of claim 2 wherein the means for venting the housing is a stopcock.

4. The tool of claim 1, including a tubular sleeve surrounding the elongated shaft, the tubular sleeve extending coaxially with the elongated shaft through the housing.

5. The tool of claim 4 wherein the tubular sleeve is mounted for axial movement with respect to the housing and including locking means for selectively securing the elongated shaft against movement with respect to the housing.

6. The tool of claim 4 wherein the elongated shaft is mounted for sliding movement with respect to the tubular sleeve.

7. The tool of claim 1 and including a handle attached to another end of the shaft remote from the socket for manual rotation of the shaft.

* * * * *

UNITED STATES PATENT AND TRADEMARK OFFICE
CERTIFICATE OF CORRECTION

PATENT NO. : 5,511,578
DATED : April 30, 1996
INVENTOR(S) : Dennis J. Wagner

It is certified that error appears in the above-indentified patent and that said Letters Patent is hereby corrected as shown below:

Column 7, line 24, after "shaft" insert comma --,--;
line 25, "with" should read --within--.

Column 8, after "plug" insert --within said hole--.

Signed and Sealed this

Twenty-fifth Day of February, 1997

Attest:

BRUCE LEHMAN

Attesting Officer

Commissioner of Patents and Trademarks